Sept. 29, 1959

J. K. HALE ET AL 2,906,077

AGRICULTURAL IMPLEMENT

Filed Oct. 17, 1956

INVENTORS
JOHN K. HALE
& HORACE G. McCARTY

BY Joseph Allen Brown
ATTORNEY

Sept. 29, 1959  J. K. HALE ET AL  2,906,077
AGRICULTURAL IMPLEMENT
Filed Oct. 17, 1956  4 Sheets-Sheet 2

INVENTORS
JOHN K. HALE
& HORACE G. McCARTY
BY Joseph Allen Brown
ATTORNEY

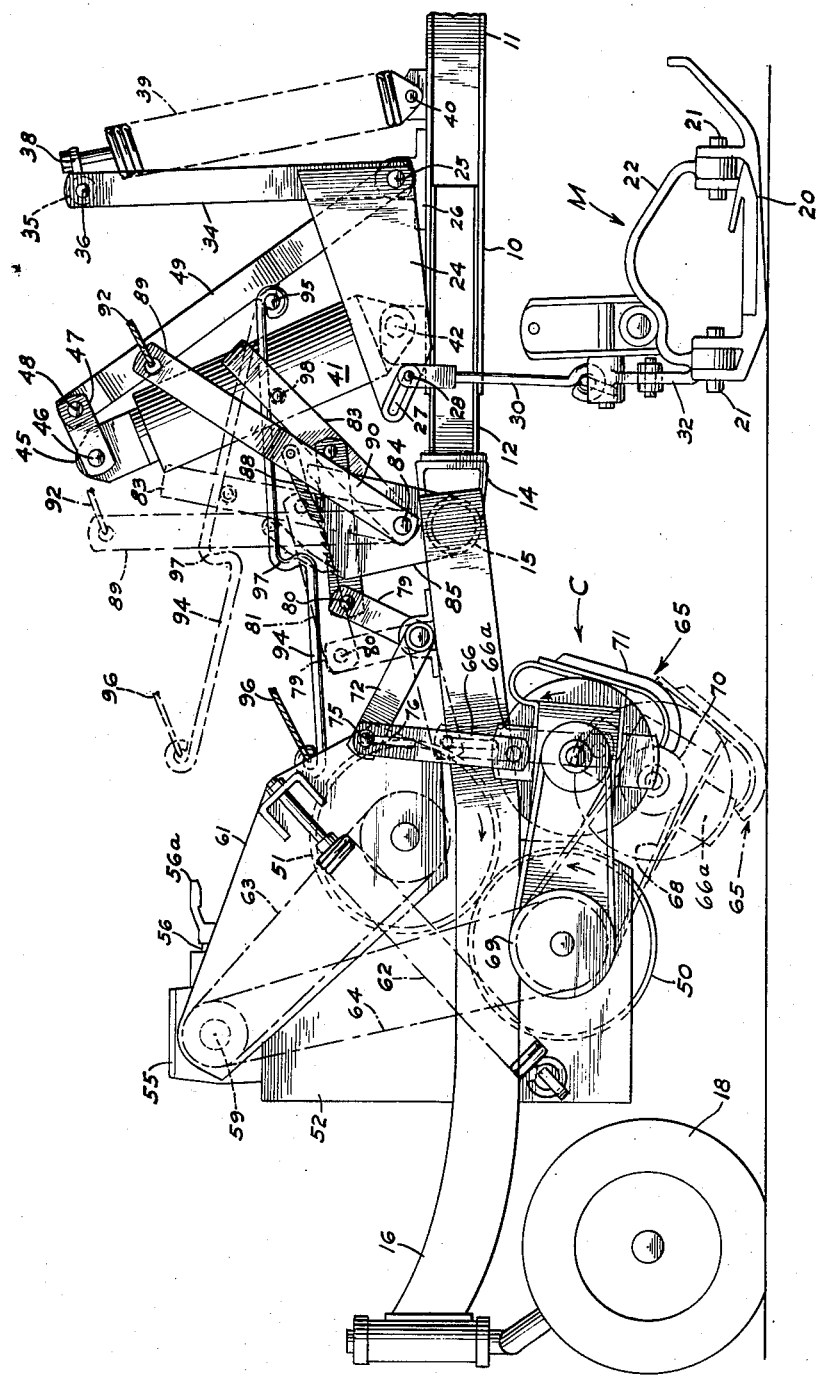

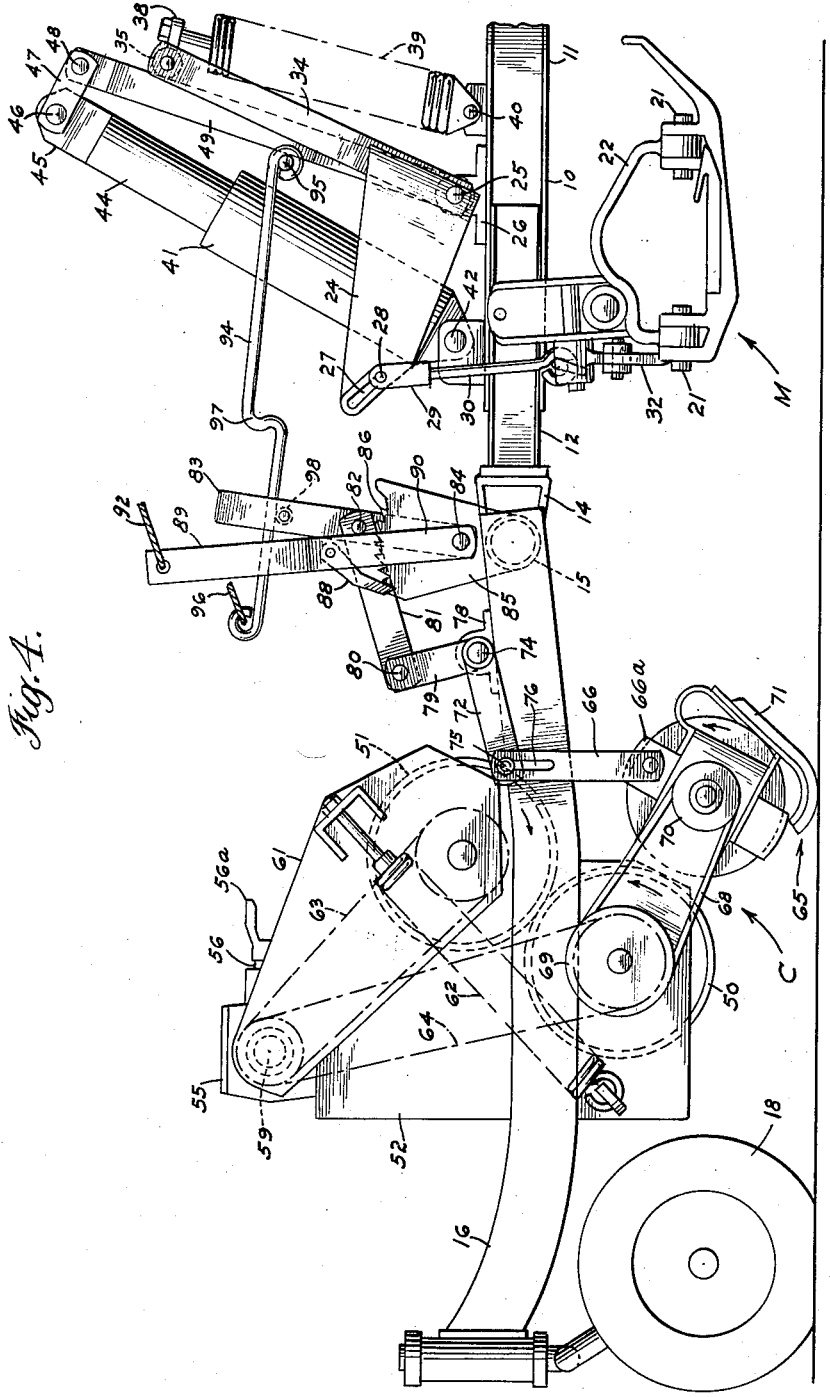

United States Patent Office 2,906,077
Patented Sept. 29, 1959

2,906,077
AGRICULTURAL IMPLEMENT

John K. Hale and Horace G. McCarty, New Holland, Pa., assignors to Sperry Rand Corporation, New Holland, Pa., a corporation of Delaware Application October 17, 1956, Serial No. 616,453

5 Claims. (Cl. 56—1)

The present invention relates generally to agricultural machinery, and more particularly to control mechanism for such machinery.

When a field of crop material is ready for harvesting, some farmers follow the procedure of mowing the crop, then crushing it to facilitate or speed-up drying, and then recovering the crop, as by baling it. It has been practised, heretofore, to mow and crush in one operation, the mower being towed behind a tractor and the crusher behind the mower. Conventionally, the cutter bar of the mower is so disposed laterally relative to the crusher that it is cutting one swath while the crusher is crushing previously cut material on an adjoining swath.

When such a combination mower-crusher is operated, only the mower is used at the start to cut a first swath. Then, the crusher is also used to crush this first swath while the mover is cutting a second swath. After the final swath has been cut in the field, and the second to last swath crushed, only the crusher is used on the final swath.

Conventionally, the cutter bar of the mower and the pick-up mechanism of the crusher are adapted to be positioned, selectively, either in lowered operating position, or elevated inoperative position. It is an object of this invention to provide a control mechanism whereby the tractor operator may, selectively, maintain both the cutter bar of the mower and the pick-up mechanism of the crusher in elevated inoperative position, or both in down, operative position, or one up and the other down.

Another object of this invention is to provide control mechanism of the character described whereby the cutter bar of the mower and the pick-up mechanism of the crusher may be elevated or lowered independently of each other.

Another object of this invention is to provide a control mechanism of the character described which may be operated to lift, or lower, the pick-up of the crusher and the cutter bar of the mower simultaneously.

Another object of this invention is to provide a relatively simple, unitary control mechanism for machinery of the character described.

A further object of this invention is to provide a control mechanism of the character described which is completely controllable by the operator of the tractor from the tractor seat.

A still further object of this invention is to provide a control mechanism of the character described which has relatively few parts compared to similar control mechanisms of prior design and is, therefore, inexpensive to manufacture.

Other objects of this invention will be apparent hereinafter from the specification and from the recital in the appended claims.

In the drawings:

Figure 3 is a view similar to Fig. 1, but showing the mower cutter bar in lowered position, and the crusher pick-up in raised position in full lines and in lowered position in dotted lines; and, Fig. 4 is a view similar to Figs. 1 and 3 showing the mower cutter bar in raised position and the crusher pick-up in lowered position.

Figure 1:
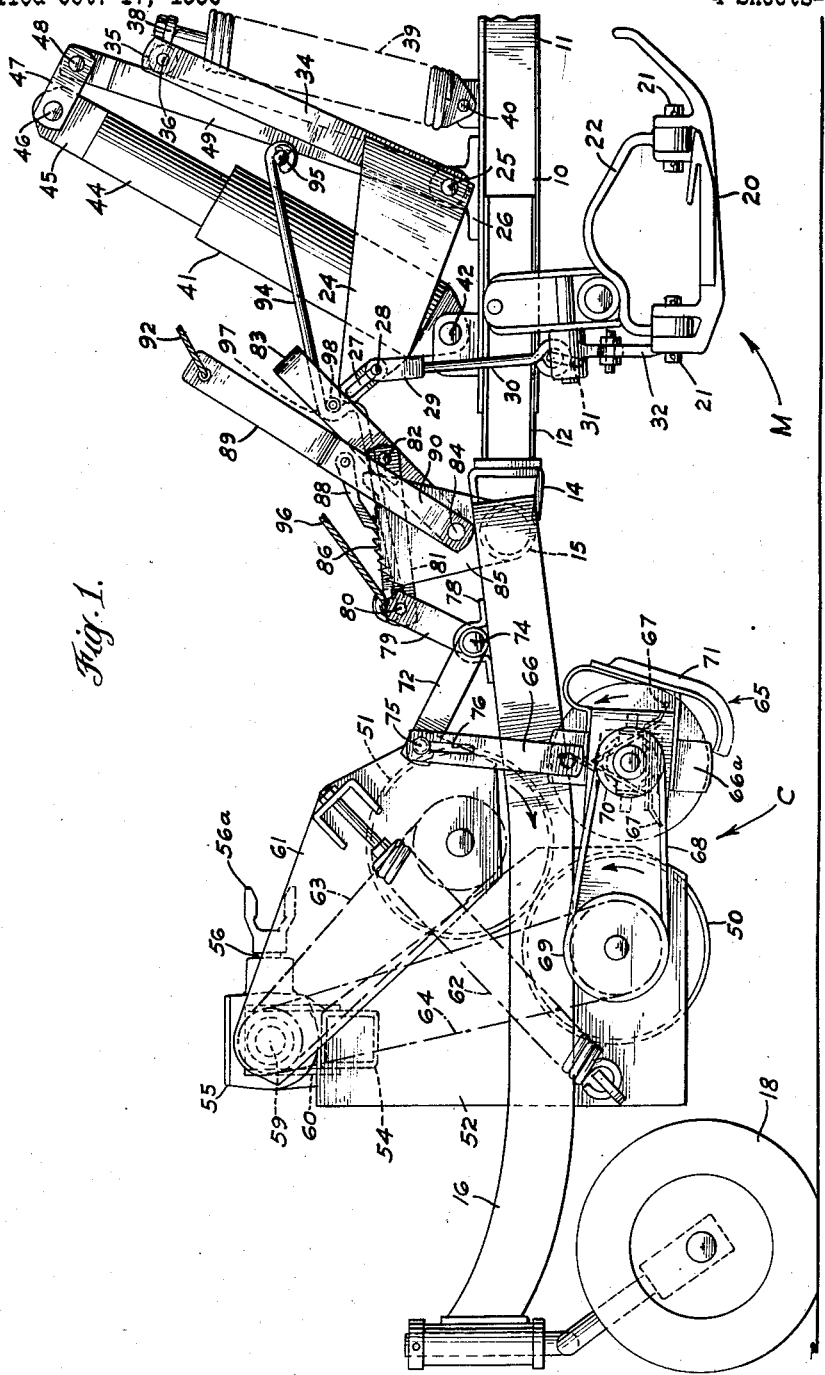
Fig. 1 is a fragmentary side elevation of a combination mower-crusher, parts of each implement being omitted for purposes of clarity, and illustrating control mechanism constructed according to this invention. The cutter bar of the mower and the pick-up of the crusher are both shown in raised positions.
Figure 2:
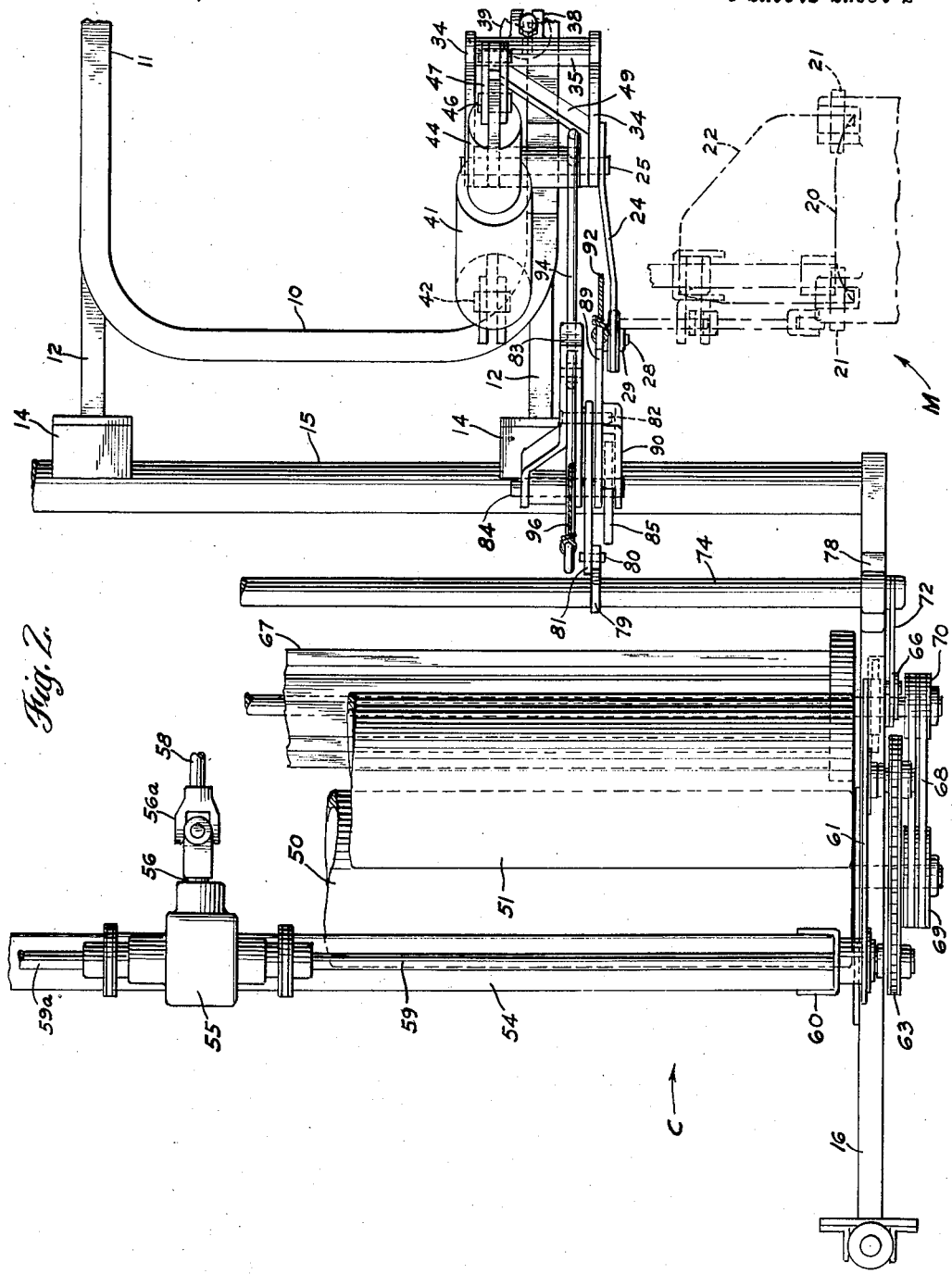
Fig. 2 is a fragmentary plan view of Fig. 1.

Referring now to the drawings by numerals of reference, and particularly to Figs. 1 and 2, M denotes generally a mower and C a crusher operable in combination to process crop material.

The mower has a frame 10, the forward end 11 of which is connectable to and suppotable by a tractor, not shown. Frame 10 has rearwardly projecting end portions 12—12 rigidly connected to fixed brackets 14—14 on a transverse cross pipe 15 at the front end of crusher C. Cross pipe 15 extends between longitudinally extending crusher frame members 16, one of which is shown. The rear end of each frame member 16 is supported on a caster-wheel 18. It will thus be seen that the mower frame is suspended above the ground between the tractor and the crusher, and the crusher frame is supported at its front end by its connection to the mower frame and at its rear end by the caster wheels 18.

Mower M is generally of conventional construction having a cutter bar 20 which projects transversely relative to frame 10 and to the direction of travel of the tractor and the implements. Cutter bar 20 is hingedly connected at 21—21 to a yoke 22; and, it is supported from a crank arm 24. Crank arm 24 is pivotally supported on a pin 25 projecting from a block 26 affixed to frame 10. The crank arm has a lost motion slot 27 in which a pin 28 of a clevis 29 of a depending link 30 is slidable. The lower end of link 30 is connected through element 31 and arm 32 to cutter bar 20.

Crank arm 24 is pivoted to an "up" position as shown in Figs. 1 and 4, or to a "down" position as shown in Fig. 3 by means of a pair of vertically extending spaced parallel arms 34. Arms 34 are pivoted at their lower ends on pin 25; and, crank arm 24 is rigidly affixed to one of the arms. The upper ends of the arms 34 are interconnected by a cylindrical member 35 mounted on a cross pin 36. Pin 36 has an ear 38 to which an upper end of a spring 39 is connected. Spring 39 is pivotally supported at its lower end at 40 on frame 10. When in down position (Fig. 3), the cutter bar 20 is resiliently supported by spring 39; and, the lost motion slot connection 27—28 between the crank arm 24 and link 30 permits vertical movement of cutter bar 20 responsive to changes in the contour of the ground over which the mower is travelling without causing pivotal movement of the crank arm 24.

Cutter bar 20 is held in an "up" inoperative position or lowered to a "down" operative position by means of a hydraulic cylinder 41. Cylinder 41 is pivoted at 42 on frame 10. It has a piston, not shown, the rod 44 of which extends outwardly of the cylinder. Rod 44 has a flattened outer end 45 which carries a pin 46 on which spaced parallel links 47 are pivotal. Links 47 extend on opposite sides of end 45 and are interconnected at their outer ends by a pin 48. Connected to pin 48 and between links 47 is one end of a lever 49. The opposite end of this lever 49 is pivotal on pin 25 on frame 10.

Cylinder 41, piston 44, links 47, and lever 49 are so disposed relative to each other and to arms 34 that when the piston and cylinder 41 is extended outwardly as shown in Fig. 1, lever 49 engages roller 35 thereby holding arms 34 pivoted forwardly and crank arm 24 lifted upwardly. When the piston in cylinder 41 is retracted, the various parts of the mechanism are shifted to the positions shown in Fig. 3. The retraction of the hydraulic piston causes cylinder 41 to be pivoted rearwardly. This moves lever 49 rearwardly and out of engagement with roller 35. Since lever 49 no longer holds arms 34 pivoted forwardly, the weight of cutter bar 20 acting through arm 32, element 31, link 30, and crank arm 24 pivots arms 34 rearwardly and allows the cutter bar to drop to the ground. The downward movement of the cutter bar is resisted by spring 39 which provides a resilient support for the cutter bar.

The hydraulic fluid connections for cylinder 41 and the control means therefor extending to the tractor are not shown, such structure being conventional. Likewise, the driving means and other parts of the mower M are omitted, there being shown only sufficient structure for a proper understanding of applicant's invention.

Referring now to crusher C, it comprises a pair of cooperative, parallel, horizontal crusher rolls, namely, lower roll 50 and upper roll 51. Lower roll 50 is rotatably supported in a pair of spaced vertical plates 52, one of which is shown, carried on the crusher frame. Plates 52 are connected adjacent their upper ends by a cross member 54 which is generally rectangular in cross section. Supported medially on cross member 54 is a gear box 55 which has an input shaft 56 connectable through a universal coupling 56a to a P.T.O. shaft 58 driven from the tractor. Projecting from opposite sides of the gear box are output shafts 59 and 59a supported at their respective outer ends in pedestal-bearing mountings 60.

Each mounting 60 pivotally supports a plate 61 in which one end of upper roll 51 is rotatably mounted. Upper roll 51 and plates 61 are swingable about the axes of shafts 59 and 59a, and relative to the crusher frame, whereby upper roll 51 may pivot away from lower roll 50. However, such movement is resisted by gravity, and by biasing springs 62 at opposite ends of the crusher. The upper end of each spring 62 is connected to a plate 61 and at its lower end to a plate 52.

Upper roll 51 is driven from shaft 59 through endless chain 63. Lower roll 50 is driven from shaft 59a by endless chain 64. When viewed as shown in Fig. 1, upper roll 51 rotates clockwise and lower roll 50 counter-clockwise, thereby producing a feeding action between them.

Rotatable in front of the crusher roll is a stripperless pick-up reel. Pick-up reel 65 is supported from depending links 66 at opposite sides of the machine for movement, selectively, to a raised position as shown in Fig. 1 or a lowered position as shown in Fig. 4. The reel has cross members 67 (Figs. 1 and 2) extending parallel to the rotational axis of the reel and provided with longitudinal, crop engaging, marginal edges which are operable to elevate crop material on the ground. The pick-up 65 is driven from lower crusher roll 50 through endless belts 68 trained over double pulleys 69 and 70, on stub shafts at adjacent ends of the lower roll and pick-up, respectively. When viewed as shown in Fig. 1, pick-up 65 rotates counter-clockwise.

The respective ends of pick-up 65 carry resilient runners 71 on which the pick-up may ride when it is in a down position. The pick-up is connected to links 66 by supports 66a on which the double pulley 69 and 70 are mounted.

The depending links 66, which support reel 65, depend from the free ends of crank arms 72 affixed to the respective ends of a transverse pivotal member 74 on the forward end of the crusher frame. Each crank arm has a pin 75 which is slidable in lost motion slot 76 in its associated link 66. Thus, reel 65 may move up and down responsive to changes in the coutour in the ground when in a down position.

The extension of crank arms 72 is simultaneously controlled by pivotal member 74, which pivots in blocks 78 on frame members 16. Member 74 is adapted to be pivoted by radial lever 79 welded to it. Lever 79 is pivotally connected at 80 to one end of a link arm 81, the other end of which is pivoted on a pin 82 carried on lever 83. Lever 83 is pivoted at its lower bifurcated end on a pin 84 on an upstanding bracket 85 welded to cross-pipe 15.

The upper end of bracket 85 has ratchet teeth 86; and, operative with these teeth is a conventional pawl 88 carried on a lever arm 89 also pivoted on pin 84. The lower end of lever arm 89 is bifurcated, one leg 90 of the bifurcation engaging a projecting portion on pin 82 of lever 83. Arm 89 is biased by any suitable means, not shown, towards the left end of bracket 85 (Fig. 1).

Lever arm 89 is under the control of the operator of the tractor through a rope 92. When it is desired to raise reel 65 from the position shown in Fig. 4 to the position shown in Fig. 1, the operator pulls rope 92. This pivots lever arm 89 about pivot 84 and moves the pawl 88 on ratchet teeth 86 of bracket 85. In pivoting, lever 89 engages the pin 82 to which arm 81 is attached, thereby pulling arm 81 with it and shifting it forwardly. Arm 81 pivots cross member 74 through radial lever 79. This swings crank arms 72 upwardly thereby lifting the pick-up reel 65.

Although not shown in detail here, the ratchet arrangement employed in elevating the reel is similar to that shown in Schumacher U.S. Patent No. 2,826,933 issued March 18, 1958, entitled "Self-Resetting Control Mechanism" and assigned to the assignee of this application. The pawl 88 is biased by a spring to a position wherein it rides over the teeth 86 when lever 89 is moved from left to right (Fig. 1). At the extreme right hand end of the teeth 86, there is provided a fixed cam (not shown) which shifts the pawl 88 laterally whereby the pawl may move freely from right to left when rope 92 is played out to drop the pick-up. At the extreme left hand end of teeth 86 is a second fixed cam surface which shifts pawl 88 inwardly again and into engagement with the teeth 86. Thus, to drop reel 86 from the position shown in Fig. 1 to the position shown in Fig. 4, the operator yanks rope 92 to pivot lever 89 further to the right and to bring pawl 88 into engagement with the fixed right hand cam to thereby shift pawl 88 laterally. He then allows lever 88 to pivot rearwardly under control of rope 92. The lever 89 is pivoted rearwardly by the weight of the pick-up reel pulling against it through pin 82 on lever 83 and connected to arm 81. As the reel drops and pawl 88 moves from right to left, and when the pawl comes into contact with the left hand cam it is shifted back into engagement with the ratchet teeth 86.

As thus far described, it is seen that the cutter bar 20 of the mower end is adapted to be dropped to operating position or elevated to inoperative position, through actuation of hydraulic cylinder 41. With the crusher C, the pick-up 65 may be elevated or dropped through pivoting control lever 89 by means of rope 92. The cutter bar 20 may be raised or lowered independently of pick-up reel 65. Likewise, pick-up reel 65 may be raised or lowered independently of cutter bar 20.

In order that the cutter bar and pick-up may be raised or lowered simultaneously, a link 94 is provided between the respective mechanisms for raising or lowering the cutter bar and pick-up reel. One end of link 94 is connected to a pin 95 on mower lever 49. The opposite end of this link has a rope 96 connected to it which extends forwardly to the tractor operator. Link 94 is bent medially to provide a hook 97 adapted for engagement with a pin 98 on crusher lever 83.

If the cutter bar is in a down position as shown in Fig. 3 and the pick-up 65 is likewise down as indicated in dotted lines also in Fig. 3, both may be simultaneously raised by leaving link 94 as shown in solid lines and then actuating hydraulic cylinder 41. As mower lever 49 is pivoted by the hydraulic cylinder, the cutter bar 20 is elevated and link 94 is shifted forwardly. Hook 97 engages pin 98 thereby pivoting lever 83 forwardly. The pivoting of lever 83 acts through 81, 79, 72 and 66 to lift the pick-up reel. Therefore, both the cutter bar and reel are simultaneously lifted.

On the next actuation of cylinder 41 the cutter bar will be dropped. Whether or not the pick-up will be dropped will depend upon the position of lever 89. If lever 89 is set as shown in Fig. 1 with pawl 88 in engagement with a tooth adjacent the forward end of the set of ratchet teeth 86, then the pick-up will stay up when the mower is dropped. If lever 89 is set by rope 92 with pawl 88 at the far left of the teeth 86, then the pick-up likewise will be lowered. Setting of pawl 88 to the left end of teeth 86 while pick-up 65 is held elevated by link 94 and the hydraulic mechanism is achieved by pulling lever 89 to the far right so that the cam means will shift pawl 88 laterally. The biasing means will then pull the lever to a left hand position if rope 92 is payed out.

For the tractor operator to lift the cutter bar 20 of the mower without elevating the pick-up on the crusher, the operator merely keeps the link 94 elevated so that the hook 97 and pin 98 do not come into engagement when the hydraulic cylinder 41 is pivoted forwardly.

If the operator does not wish to exert the effort required to elevate pick-up 65, through the pawl-ratchet arrangement by pulling rope 92 when the mower M is elevated, he merely has to actuate cylinder 41 to drop the mower. Then he lets out rope 96 so that hook 97 on link 94 is positioned to engage pin 98 and actuates the hydraulic controls to elevate the mower. As the cutter bar lifts up, pick-up 65 comes with it due to the pull extended by link 94 on pin 98.

In summary, with applicants' simple control mechanism, cutter bar 20 may be set in an up or down position independently of the pick-up 65. Pick-up 65 may be set up or down independently of cutter bar 20. The pick-up and cutter bar may be simultaneously raised by connecting the control mechanisms for the respective implements by link 94. Further, the pick-up and cutter bar may be simultaneously lowered, as previously described.

While this invention has been described in connection with a particular embodiment thereof, it will be understood that it is capable of further modification and other uses, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described our invention what we claim is:

1. An agricultural machine comprising a mobile frame, two implements, at least, operatively mounted on said frame, vertically adjusting means operatively connected to each of said implements, a power means on said frame, interconnecting means between said power means and a first of said vertically adjusting means, and detachable interconnecting means between said power means and a second of said vertically adjusting means whereby said power means may raise and lower one of said implements alone and both of said implements together when said detachable means is in engagement with said second vertically adjusting means.

2. An agricultural machine as recited in claim 1 wherein said second of said vertically adjusting means includes manually operable means for raising and lowering the other of said implements when said detachable means is out of engagement.

3. An agricultural machine as recited in claim 2 wherein said first of said vertically adjusting means includes a first lever and said second of said vertically adjusting means includes a second lever, and said detachable interconnecting means comprises a hooked link pivotally connected to said first lever and a pin connected to said second lever.

4. An agricultural machine as recited in claim 3 wherein a rope is connected to said link whereby the operator of a vehicle towing said machine can pivot the link and thereby control the engagement of said hooked link and said pin.

5. An agricultural machine as recited in claim 2 wherein said manually operable means comprises a pawl and ratchet mechanism.

References Cited in the file of this patent

UNITED STATES PATENTS

| | | |
|---|---|---|
| 2,482,751 | Hartsock | Sept. 27, 1949 |
| 2,592,269 | Getz | Apr. 8, 1952 |
| 2,592,928 | Martin | Apr. 15, 1952 |
| 2,788,988 | Happe | Apr. 16, 1957 |